(12) United States Patent
Ting et al.

(10) Patent No.: US 11,616,462 B1
(45) Date of Patent: Mar. 28, 2023

(54) MOTOR PARAMETER ESTIMATION DEVICE AND METHOD

(71) Applicant: INDUSTRIAL TECHNOLOGY RESEARCH INSTITUTE, Hsinchu (TW)

(72) Inventors: Chia-Min Ting, Taoyuan (TW); Wen-Che Shen, New Taipei (TW); Chun-An Lin, Taoyuan (TW); Ya-Ling Chang, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/558,359

(22) Filed: Dec. 21, 2021

(51) Int. Cl.
*H02P 23/14* (2006.01)
*H02P 6/08* (2016.01)
*H02P 6/34* (2016.01)

(52) U.S. Cl.
CPC ............... *H02P 23/14* (2013.01); *H02P 6/08* (2013.01); *H02P 6/34* (2016.02)

(58) Field of Classification Search
CPC ............... H02P 23/14; H02P 6/08; H02P 6/34
USPC .................. 318/400.05, 400.04, 400.01, 700
See application file for complete search history.

(56) References Cited

U.S. PATENT DOCUMENTS

| 9,628,012 | B2 * | 4/2017 | Handa | ...................... H02P 21/22 |
| 11,075,596 | B2 | 7/2021 | Nalakath et al. | |
| 11,404,984 | B2 | 8/2022 | Gizinski et al. | |
| 2019/0393818 | A1 | 12/2019 | Gizinski et al. | |
| 2021/0021221 | A1 | 1/2021 | Glibbery et al. | |

FOREIGN PATENT DOCUMENTS

| CN | 110620540 A | 12/2019 |
| CN | 111913104 A | 11/2020 |
| TW | 347609 | 12/1998 |

(Continued)

OTHER PUBLICATIONS

Zhang et al., "An Improved Off-line Identification Technology for Parameters of Surface Permanent Magnet Synchronous Motors" IEEE, ,Aug. 2017.

(Continued)

*Primary Examiner* — David Luo
(74) *Attorney, Agent, or Firm* — Maschoff Brennan

(57) ABSTRACT

A motor parameter estimation method includes obtaining an operation signal of a motor, wherein the operation signal includes an encoder signal, a phase current and a driving voltage, obtaining a number of poles according to the encoder signal and the phase current, performing a simulation procedure according to the driving voltage, the number of poles and an initial random parameter set, wherein the simulation procedure is calculating a simulation response current, calculating an error value between the simulation response current and the phase current, determining whether the error value falls into a threshold range, if the error value falls outside of the threshold range, performing the simulation procedure according to the driving voltage, the number of poles and an update random parameter set, and if the error value falls into of the threshold range, outputting the number of poles and the initial random parameter set.

15 Claims, 5 Drawing Sheets

(56) References Cited

FOREIGN PATENT DOCUMENTS

| TW | I275238 B | 3/2007 |
| TW | I731699 B | 6/2021 |

OTHER PUBLICATIONS

Naung et al., "Implementation of Data Driven Control System of DC Motor by Using System Identification Process" IEEE, 2018.

Donjaroemnon et al., "Mathematical model construction of DC Motor by closed-loop system Identification technique Using Matlab/Simulink" iEECON2021, Mar. 10, 2021.

Lu et al., "Online identification for permanent magnet synchronous motor based on recursive fixed memory least square method under steady state" Jul. 26, 2017.

Akhtar et al., "Reference Signal Generation for BLDC Motor Drives based on Different Sector Identification Methodologies using Hall Based Sensor" IEEE 2018.

Jiang et al., "Self-identification of Key Parameters of Spindle Motor Drives" Nov. 15, 2018.

Taiwan Office Action dated Dec. 5, 2022 as received in application No. 111100102.

\* cited by examiner

MOTOR PARAMETER ESTIMATION DEVICE AND METHOD

CROSS-REFERENCE TO RELATED APPLICATIONS

Background

1. Technical Field

This disclosure relates to a motor parameter estimation device and method.

2. Related Art

Permanent-magnet synchronous motor (PMSM) is often applied to automatic equipment. The motor revolution and torque output are controlled by motor driver. Therefore, parameters stored in the motor driver are related to the operation of the motor. Specific motor parameters (such as, capacitance, resistance, number of poles, rotor inertia) may be required when trying to control the motor operation more accurately, so that the accuracy of motor operation may be improved through the known motor parameters.

In practice, motor and motor driver are usually manufactured by different manufacturers. Therefore, the operator of the motor driver may not know the parameter of the motor installed on the automatic equipment, and have difficulty in dealing with the parameter errors of the motor generated due to manufacturing tolerances. Accordingly, the operator of the motor driver is unable to directly adjust the motor parameters to the expected values when trying to adjust the performance of the motor driver.

A common method for confirming motor parameters is through a testing platform. First, after disassembling the motor from the automation equipment, the motor is reinstalled on the testing platform. Then, the motor driver drives the motor to operate and activates the related equipment of the testing platform. Finally, analysis is performed according to the sensing signal obtained by the testing platform and the actuation signal input from the motor driver to the motor to obtain the motor parameters. However, this method is not only complicated, but also increases the possibility of coupling errors between the motor, pre-stage device and post-stage device on the automation equipment.

SUMMARY

Accordingly, this disclosure provides a motor parameter estimation device and method.

According to one or more embodiment of this disclosure, a motor parameter estimation method, executed by a motor parameter estimation device, includes: obtaining an operation signal of a motor, wherein the operation signal comprises an encoder signal, a phase current and a driving voltage; obtaining an operation signal of a motor, wherein the operation signal comprises an encoder signal, a phase current and a driving voltage; performing a simulation procedure according to the driving voltage, the number of poles and an initial random parameter set, wherein the simulation procedure is calculating a simulation response current through a motor response simulation system; calculating an error value between the simulation response current and the phase current; determining whether the error value falls into a threshold range; if the error value falls outside the threshold range, performing the simulation procedure according to the driving voltage, the number of poles and an update random parameter set; and if the error value falls into of the threshold range, outputting the number of poles and the initial random parameter set.

According to one or more embodiment of this disclosure, a motor parameter estimation device includes: a data capturing element, configured to capture an operation signal of a motor, wherein the operation signal comprises an encoder signal, a phase current and a driving voltage; and a processor, connected to the data capturing element to receive the operation signal, the processor having a motor response simulation system, the processor obtaining a number of poles of the motor according to the encoder signal and the phase current, performing a simulation procedure according to the driving voltage, the number of poles and an initial random parameter set, wherein the simulation procedure is calculating a simulation response current through the motor response simulation system, the processor calculating an error value between the simulation response current and the phase current, and performing the simulation procedure according to the driving voltage, the number of poles and an update random parameter set if the error value falls outside a threshold range, the processor outputting the number of poles and the initial random parameter set if the error value falls into of the threshold range.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
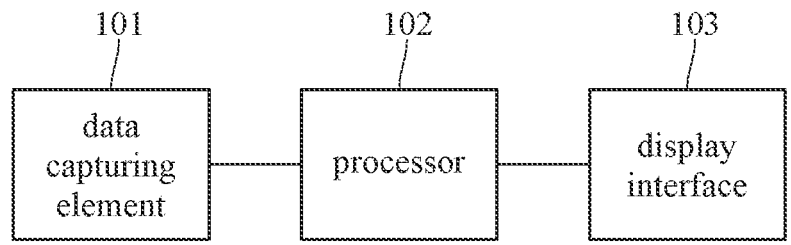
FIG. 1 is a block diagram illustrating a motor parameter estimation device according to an embodiment of the present disclosure.

Please refer to FIG. 1. FIG. 1 is a block diagram illustrating a motor parameter estimation device according to an embodiment of the present disclosure. The motor parameter estimation device 100 of the present disclosure may be connected to a motor in parallel to estimate the parameters of the motor. The motor may be a single phase motor or a polyphaser motor, the present disclosure does not limit the type of the motor. The motor parameter estimation device 100 of the present disclosure may at least include a data capturing element 101 and a processor 102. The data capturing element 101 and the processor 102 may be electrically connected to each other, or may be in communication connection with each other, the present disclosure does not limit the connection type between the data capturing element 101 and the processor 102. In addition, the motor parameter estimation device 100 of the present disclosure may further include a display interface 103 electrically connected to or in communication connection with the processor 102, to receive and present data outputted by the processor 102, wherein the display interface 103 may be a computer screen, a cell phone screen or any other human machine interface, the present disclosure does not limit the type of interface implementing the display interface 103.

The data capturing element 101 may include a voltage sensor, a current sensor and an encoder etc. The data capturing element 101 may capture an operation signal of the motor through galvanic isolation, wherein the operation signal includes an encoder signal, a phase current and a driving voltage.

Specifically, the rotational position (or amount of rotation) of the motor may be detected by the encoder. The encoder outputs the encoder signal according to the position of the rotation axis of the motor, wherein the encoder signal is preferably a digital signal in a square waveform.

The input current of the motor is, for example, a single phase current, and the current sensor of the data capturing element 101 may detect the input current of the motor to capture and output the phase current to the processor 102. The voltage sensor of the data capturing element 101 may sense the voltage used for driving the motor, to capture and output the driving voltage of the motor to the processor 102.

Figure 2:
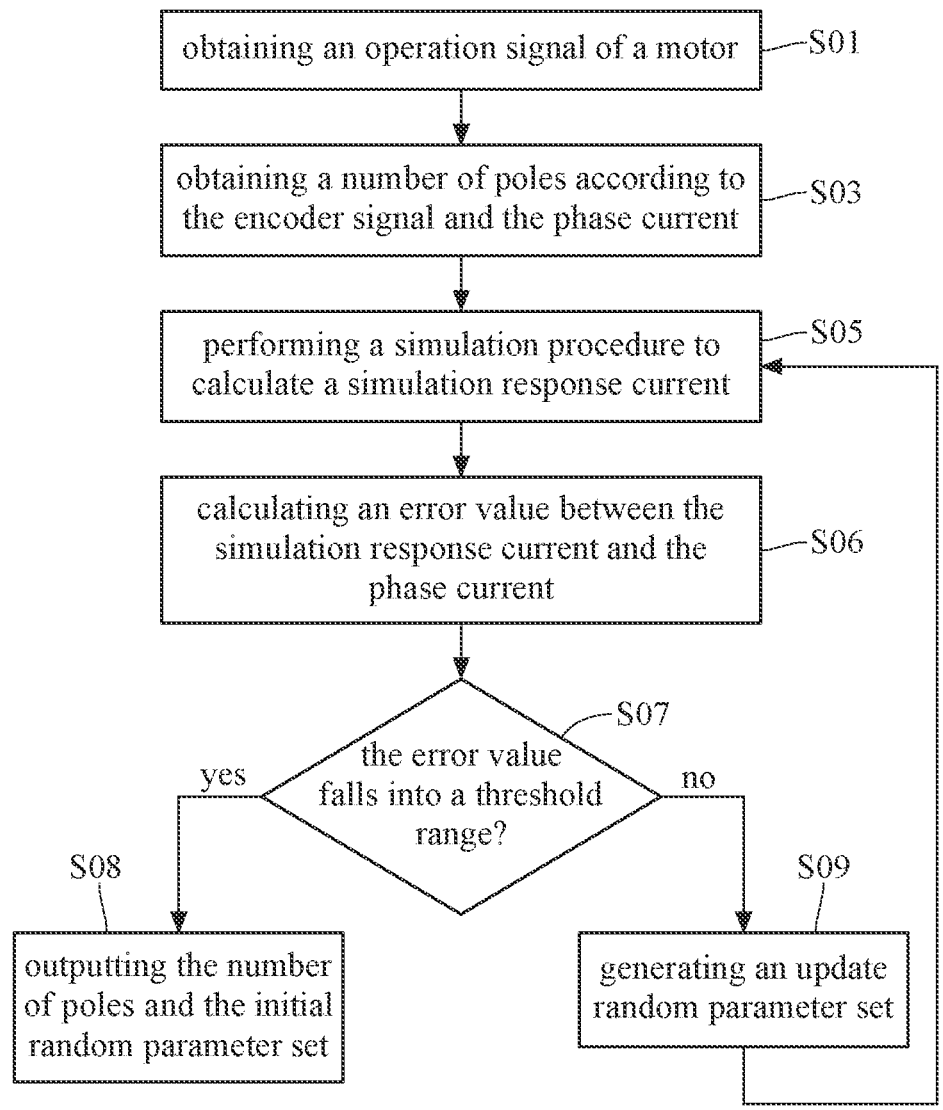
FIG. 2 is a flow chart illustrating a motor parameter estimation method according to an embodiment of the present disclosure.

After the data capturing element 101 outputting the operation signal of the motor, the processor 102 may estimate motor parameters according to the operation signal. To explain estimating the motor parameters by the processor 102 in more detail, please refer to FIGS. 1 and 2, wherein FIG. 2 is a flow chart illustrating a motor parameter estimation method according to an embodiment of the present disclosure, wherein the motor parameter estimation method may be executed by the motor parameter estimation device of the present

DISCLOSURE

In step S01, the processor 102 obtains the operation signal of the motor from the data capturing element 101; subsequently, in step S03, the processor 102 obtains a number of poles of the motor according to the encoder signal and the phase current. As described above, in the operation signal obtained from the data capturing element 101 in step S01, the operation signal includes the encoder signal, the phase current and the driving voltage. In step S03, the processor 102 may obtain the number of poles of the motor according to the encoder signal and the phase current of the operation signal. Take three-phase motor as an example, said single phase current may be a phase current of one of the U phase current, V phase current and W phase current of the three-phase motor. When a number of zero crossover of the encoder signal is two, and a number of zero crossover of one of the three phase currents is six, the number of poles is six. In other words, after obtaining the number of zero crossover of the encoder signal and the number of zero crossover of one of the phase currents, the processor 102 may use the bigger one as the number of poles.

In step S05, the processor 102 performs a simulation procedure according to the driving voltage, the number of poles and an initial random parameter set, wherein the simulation procedure is calculating a simulation response current through a motor response simulation system. In detail, the initial random parameter set may include a plurality of parameters, such as rotor inertia of the motor, voltage constant of the motor (or induced electromotive force constant, induced voltage constant), motor resistance, motor inductance, motor revolution (rotational speed) etc. The processor 102 may include the motor response simulation system, wherein the motor response simulation system may be implemented by a dynamic response system based on software program. Accordingly, in the simulation procedure of this step, the processor 102 sets the parameters in the motor response simulation system based on the simulation procedure, the number of poles and the initial random parameter set, then uses the driving voltage as the input of the motor response simulation system that has been set. Therefore, the motor response simulation system may be used to calculate the simulation response current.

After the processor 102 calculating the simulation response current by the motor response simulation system, in step S06, the processor 102 calculates an error value between the simulation response current and the phase current; and in step S07, the processor 102 determines whether the error value between the simulation response current and the phase current falls into a threshold range. When the error value falls into the threshold range, it means the error value between the simulation response current and the phase current is within an allowable range.

The processor 102 may directly calculate the difference between the simulation response current and the phase current, and use the calculated difference as said error value. Or, the processor 102 may use the calculated value obtained according to equation (1) as said error value. In equation (1), "period" indicates the time of the number of the zero crossover of the encoder signal goes from zero to two. An upper limit of the threshold range may be a square of 0.1 ampere or a square of 0.1 milliampere, the present disclosure does not limit the actual number of the threshold range.

$$\text{error value} = \int_0^{period} (\text{simulation response current} - \text{phase current})^2 dt \quad \text{equation (1)}$$

When the error value falls into the threshold range, the processor 102 may perform step S08, which is outputting the number of poles and the initial random parameter set. For example, the processor 102 may output the number of poles and the initial random parameter set to the display interface 103 to present the estimated motor parameters. Or, the processor 102 may output the number of poles and the initial random parameter set to a memory, for the memory to store the number of poles and the initial random parameter set, the present disclosure does not limit the receiving end of the processor 102 outputting the number of poles and the initial random parameter set.

When the error value falls outside of the threshold range, the processor 102 may perform step S09, which is generating the update random parameter set. After obtaining the update random parameter set, the processor 102 may perform the simulation procedure of step S05 again according to the driving voltage, the number of poles and the update random parameter set. Some of the parameters of the update random parameter set may be the same as the parameters of the initial random parameter set, the parameters of the update random parameter set may also be completely different from that of the initial random parameter set. For example, the error value generated according to the initial random parameter set may be a first error value, and the error value generated according to the update random parameter set may be a second error value. The processor 102 may determine whether the second error value falls into the threshold range, and outputs the number of poles and the update random parameter set when the second error value falls into the threshold range.

Accordingly, when the simulation response current corresponding to the initial random parameter set or the update random parameter set does not make the error value to fall into the threshold range, the processor 102 may repeatedly generate a new update random parameter set, to find an update random parameter set corresponding to simulation response current in a recursion manner that makes the error value fall into the threshold range. Therefore, according to the motor parameter estimation method and device of the present disclosure, the motor parameters may be obtained without disassembling the motor from the automatic equipment and installing the motor on the testing platform. That is, the complexity of obtaining the motor parameters may be reduced, and the changing of coupling relationship between the motor and other components of the automatic equipment during the process of disassembling/installing the motor from/onto the automatic equipment may be avoided.

Figure 3:
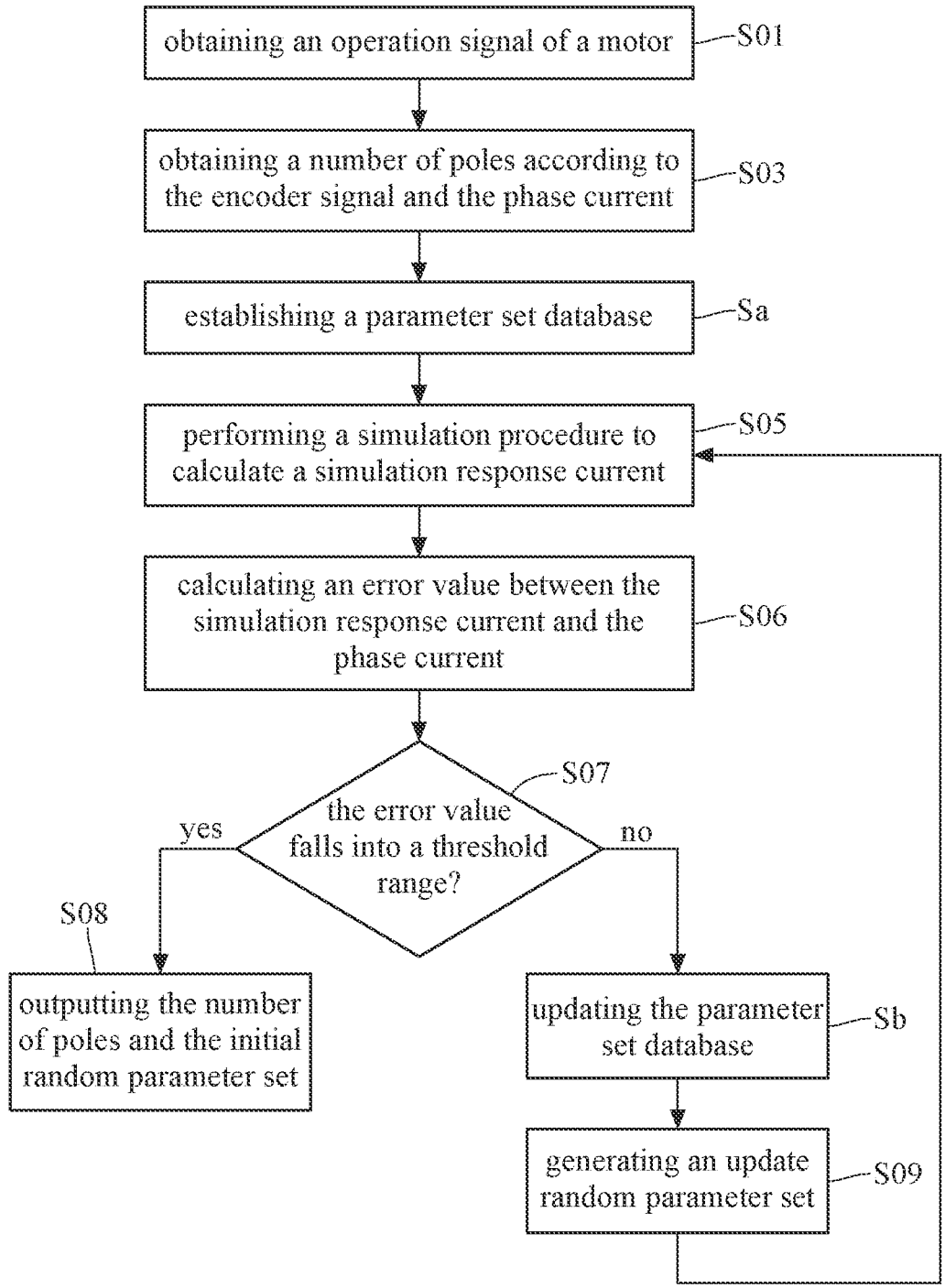
FIG. 3 is a flow chart illustrating a motor parameter estimation method according to another embodiment of the present disclosure.

Please refer to FIGS. 1 and 3 together. FIG. 3 is a flow chart illustrating a motor parameter estimation method according to another embodiment of the present disclosure. The motor parameter estimation method of FIG. 3 is similar to the motor parameter estimation method of FIG. 2, the following describes the difference between FIG. 2 and FIG. 3, which is FIG. 3 further including steps step Sa and Sb.

Step Sa is performed before step S05 of calculating the simulation response current to establish the parameter set database of the processor 102; step Sb is performed before step S09 to update the parameter set database established in step Sa.

In step Sa, the processor 102 may establish the parameter set database, wherein the parameter set database stores a plurality of candidate random parameter sets. Each of the candidate random parameter sets is different from other candidate random parameter sets, and includes a plurality of candidate parameters. The candidate parameters are the motor resistance R, the motor revolution w, the motor induction L and the motor voltage constant Ke as described above. In a preferable embodiment, a number of the number of the candidate random parameter sets is 100, but the present disclosure does not limit the actual number of the candidate random parameter sets.

Therefore, in step S05, the processor 102 selects one of the candidate random parameter sets from the parameter set database as the initial random parameter set used in step S05 to perform the simulation procedure.

Then, in step S07, when the processor 102 determines the error value between the phase current and the simulation response current does not fall into the threshold range, the processor 102 updates the parameter set database in step Sb. In step Sb, the processor 102 at least records the error value generated in step S06 to the parameter set database and connects the error value to the candidate random parameter set selected in step S05. However, in step Sb, all of the candidate random parameter sets in the parameter set database may be sorted according to the condition of the parameter set database, or the candidate random parameter sets with larger error value may be deleted from the parameter set database, which are described in the following. After updating the parameter set database, the processor 102 may select another candidate random parameter set from the parameter set database as the update random parameter set used in step S09 to perform the simulation procedure again.

Figure 4:
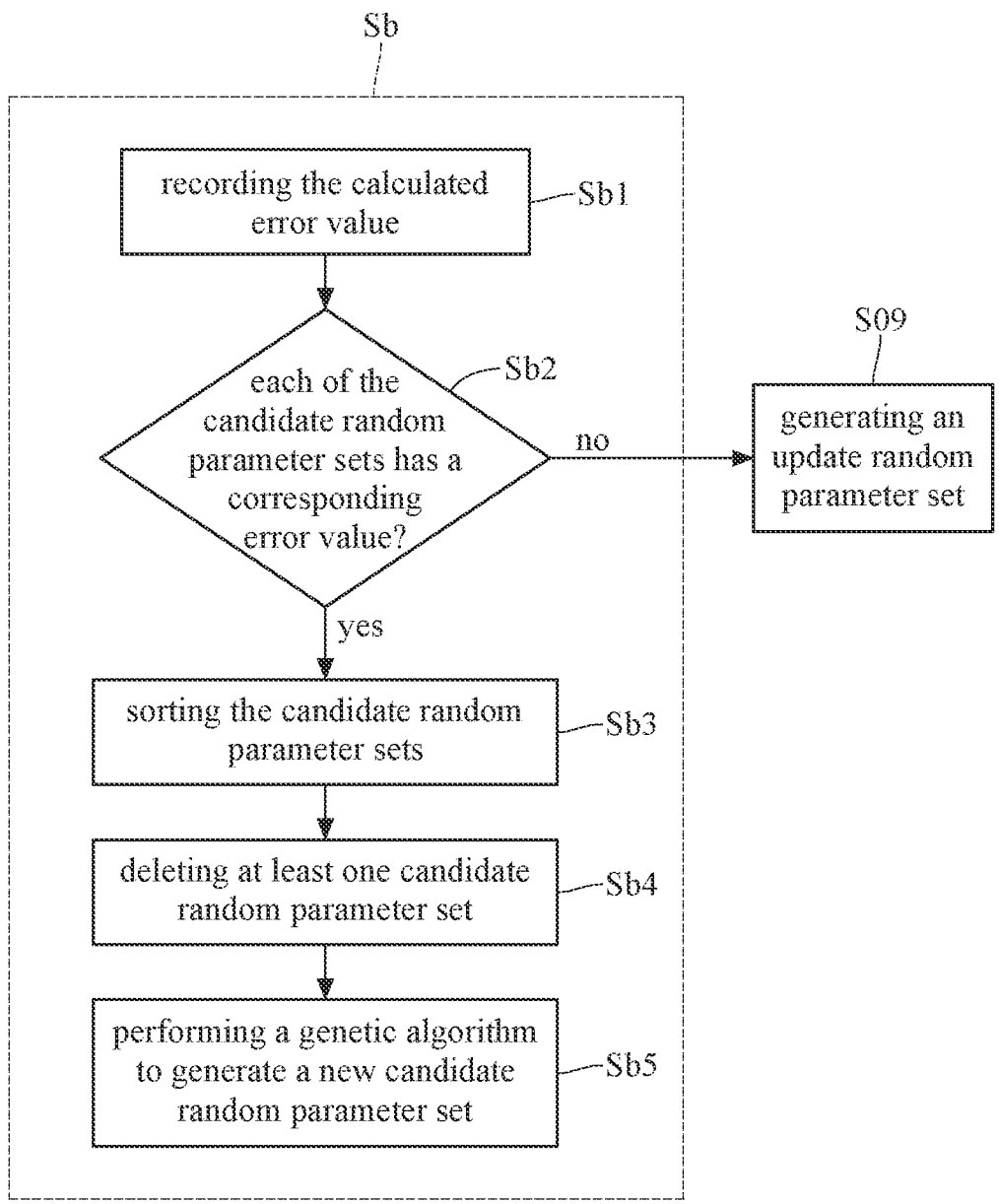
FIG. 4 illustrates the detailed flow chart of step Sb of FIG. 3.

To further elaborate the content of updating the parameter set database, please refer to FIG. 4. FIG. 4 illustrates the detailed flow chart of step Sb of FIG. 3.

First, the parameter set database may record the candidate parameter sets in a form of table as shown by the below table 1. For better understating, the following assumes the candidate parameters included in each of the candidate random parameter sets are the motor resistance R, the motor revolution w, the motor induction L and the motor voltage constant Ke.

TABLE 1

| First candidate random parameter set $(R1, \omega1, L1, Ke1)$ | First error value ERR1 |
|---|---|
| Second candidate random parameter set $(R2, \omega2, L2, Ke2)$ | Second error value ERR2 |
| Third candidate random parameter set $(R3, \omega3, L3, Ke3)$ | Third error value ERR3 |
| Fourth candidate random parameter set $(R4, \omega4, L4, Ke4)$ | |

Assuming the initial random parameter set used by the processor 102 in step S05 is the third candidate random parameter set, then in step Sb1, the processor 102 records the third error value ERR3 to table 1.

Then, in step Sb2, the processor 102 determines whether the parameter set database has recorded the error values of all candidate parameter sets. In other words, the processor 102 is determining whether each of the candidate random parameter sets in the parameter set database has a corresponding error value.

If the processor 102 determines at least one of the candidate parameter sets in the parameter set database is not yet recorded with a corresponding error value, the processor 102 may perform step S09 and use the candidate random parameter set without a corresponding error value as the update random parameter set. Take table 1 as an example, in step Sb2, the processor 102 determines the fourth candidate random parameter set is not yet recorded with a corresponding error value, the processor 102 uses the fourth candidate random parameter set as the update random parameter set used for performing step S09.

If the processor 102 determines all of the candidate parameter sets in the parameter set database are recorded with corresponding error values, in step Sb3, the processor 102 may sort all of the candidate parameter sets. Take table 2 below as an example, the processor 102 determines the sequence of the error values from large to small is the third error value, the first error value, the second error value, and then the fourth error value. Therefore, the processor 102 may sort these four candidate random parameter sets according to the error values of these four error value.

TABLE 2

| Third candidate random parameter set $(R3, w3, L3, Ke3)$ | Third error value ERR3 |
|---|---|
| First candidate random parameter set $(R1, \omega1, L1, Ke1)$ | First error value ERR1 |

TABLE 2-continued

| Second candidate random parameter set (R2, ω2, L2, Ke2) | Second error value ERR2 |
| Fourth candidate random parameter set (R4, ω4, L4, Ke4) | Fourth error value ERR4 |

Then, in step Sb4, the processor 102 deletes at least one of the candidate parameter sets, and keeps remaining candidate random parameter sets among the candidate random parameter sets, wherein the error value of the at least one of the candidate parameter sets is larger than the error values of the remaining candidate random parameter sets. The processor 102 may delete the candidate random parameter set with the largest error value from the parameter set database. In addition, the processor 102 may also delete the candidate random parameter sets with error values larger than a predetermined range, or delete one or more of the candidate random parameter sets, for the number of the remaining candidate random parameter sets meets a predetermined number, wherein the error values of the remaining candidate random parameter sets are smaller than the error values of the deleted candidate random parameter sets. Said predetermined range is used to select which of the candidate random parameter sets may be kept and which of the candidate random parameter sets may be deleted according to the error values, wherein the upper limit of the predetermined range may be larger than the upper limit of the threshold range. The predetermined number is used for the parameter set database to only keep a certain number of candidate random parameter sets, and the error values of the kept candidate random parameter sets are smaller than the error values of the deleted candidate random parameter sets. Take table 2 as an example, the processor 102 may only delete the fourth candidate random parameter set, the processor 102 may also delete the second and fourth candidate random parameter sets, and keeps the candidate random parameter sets with smaller error values After deleting at least one of the candidate parameter sets, in step Sb5, the processor 102 performs a genetic algorithm on the remaining candidate parameter sets in the parameter set database to generate new and more accurate candidate parameter sets. At this time, since the candidate random parameter sets in the parameter set database are updated according to the error values, the error values of the update random parameter sets may be smaller than that of the initial random parameter sets.

Specifically, the processor 102 may generate a new candidate random parameter set through a selection and reproduction procedure, a crossover procedure or a mutation procedure of the genetic algorithm on the remaining candidate random parameter sets.

If the processor 102 performs the selection and reproduction procedure of the genetic algorithm, the processor 102 may select parameters from different candidate random parameter sets as the new candidate random parameter set. For example, the processor 102 may select the motor resistance R1 and the motor voltage constant Ke1 from the first candidate random parameter set; the motor revolution ω2 from the second candidate random parameter set; and the motor induction L3 from the third candidate random parameter set. Then, the processor 102 may use the parameter set (R1, Ke1, ω2, L3) as the new candidate random parameter set.

If the processor 102 performs the mutation procedure of the genetic algorithm, the processor 102 may select parameters from different candidate random parameter sets and select new random parameters as the new candidate random parameter set. For example, the processor 102 may select the motor resistance R1 from the first candidate random parameter set; select the motor revolution ω2 from the second candidate random parameter set; select the motor induction L3 from the third candidate random parameter set; and randomly select a motor voltage constant Ke. Then, the processor 102 may use the parameter set (R1, Ke, ω2, L3) as the new candidate random parameter set.

If the processor 102 performs the crossover procedure of the genetic algorithm, the processor 102 may exchange parts of the parameters of the candidate random parameter sets to generate the new candidate random parameter set. For example, the processor 102 may exchange the motor resistance R1 of the first candidate random parameter set and the motor resistance R3 of the third candidate random parameter set, as well as exchange the motor induction L1 of the first candidate random parameter set and the motor induction L2 of the second candidate random parameter set. Then, the processor 102 may use the exchanged first candidate random parameter set (R3, ω1, L2, Ke1) as the new candidate random parameter set. In addition, the processor 102 may also use the exchanged second candidate random parameter set (R2, ω2, L1, Ke2) or the exchanged third candidate random parameter set (R1 ω3, L3, Ke3) as the new candidate random parameter set.

Through steps Sb3 to Sb5, the processor 102 may obtain more accurate motor parameter sets in a shorter period of time, and the processor 102 may not need to store a large amount of inaccurate motor parameter sets derived during the process of performing the genetic algorithm.

Figure 5:
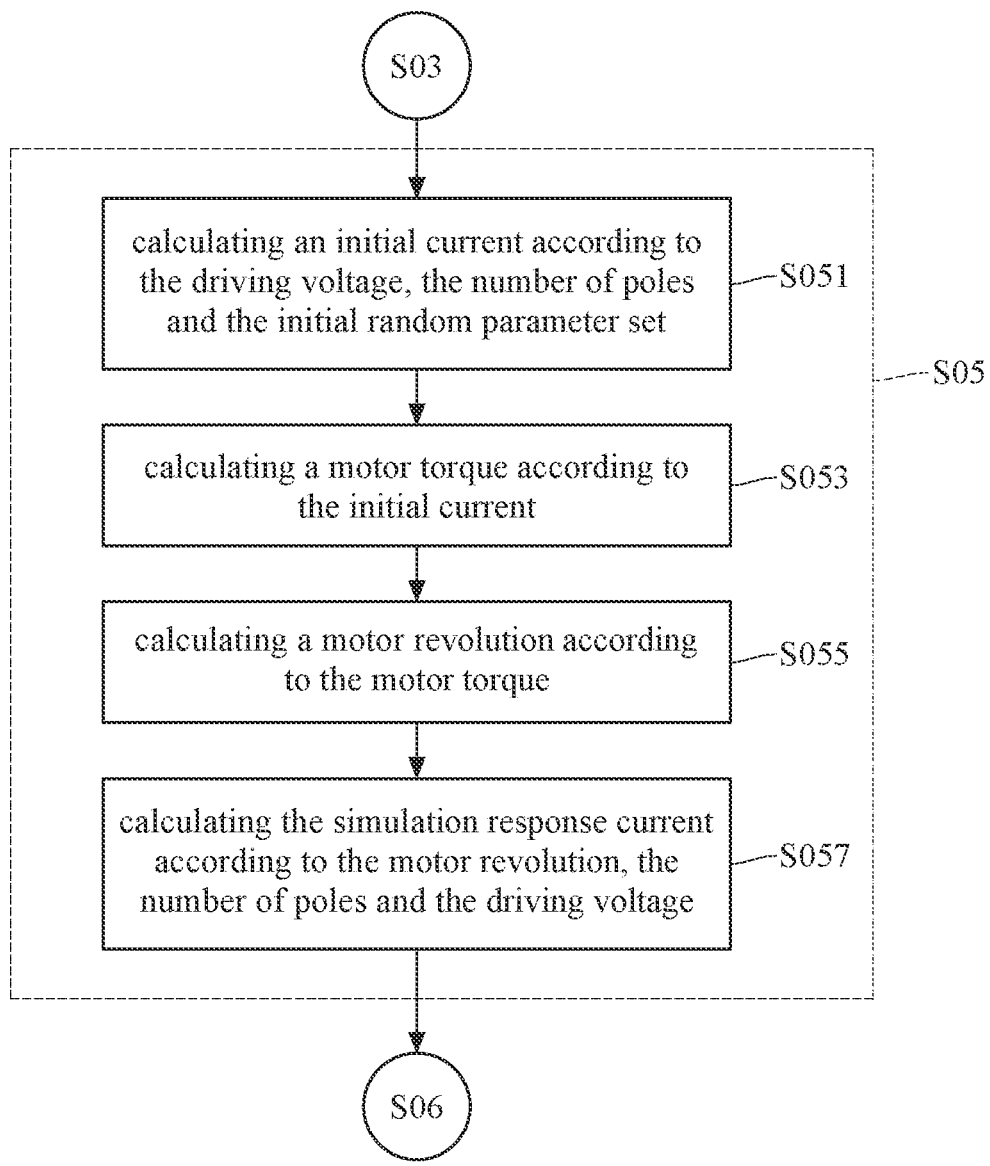
FIG. 5 illustrates the detailed flow chart of step S05 of FIGS. 2 and 3.

To further explain the motor parameter estimation method and device of the present disclosure, please refer to FIG. 5. FIG. 5 illustrates the detailed flow chart of step S05 of FIGS. 2 and 3 for explaining the processor 102 calculating the simulation response current. The initial random parameter set preferably includes the motor resistance, the motor revolution, the motor induction, the motor voltage constant, the torque constant, the rotor inertia of the motor, the coefficient of friction and the torque of the load of the motor. In addition, even though each parameter of the initial random parameter set is random, the parameters of the initial random parameter set corresponding to different power motors are preferably within reasonable ranges.

In step S051, the processor 102 calculates an initial current according to the driving voltage, the number of poles and the initial random parameter set, wherein the initial current refers to a current value estimated according to the driving voltage, the number of poles and the initial random parameter set. Step S051 may be implemented by the following equation (2).

$$V = i \cdot R + \frac{P}{2} \cdot \omega \cdot L \cdot i + K_e \cdot \omega \qquad \text{equation (2)}$$

In equation (2), V is the driving voltage; P is the number of poles; i is the initial current; R, ω, L, Ke are the random parameters of the initial random parameter set. R is the randomly selected motor resistance; ω is the randomly selected motor revolution; L is the randomly selected motor induction; and Ke is the randomly selected motor voltage constant.

In step S053, the processor 102 calculates the motor torque according to the initial current, wherein step S053 may be implemented by the following equation (3).

$$T_e = K_t i -$$ equation (3)

In equation (3), Te is the motor torque; Kt is the torque constant; i is the initial current, wherein the initial current i is the initial current calculated according to equation (2).

In step S055, the processor 102 calculates the motor revolution according to the motor torque, wherein step S055 may be implemented by the following equation (4).

$$J \cdot \frac{d\omega}{dt} + B \cdot \omega = T_e - T_L$$ equation (4)

In equation (4), J is the rotor inertia of the motor; ω is the motor revolution; B is the coefficient of friction; Te is the motor torque; T_L is the torque of the load. The coefficient of friction B indicates the coefficient of friction of the motor at each rotational location.

Then, in step S057, the processor 102 calculates the simulation response current according to the motor revolution, the driving voltage and the number of poles. In step S057, the processor 102 inputs the driving voltage, the number of poles, the motor revolution calculated using equation (4) and the remaining random parameters R, L, Ke of the initial random parameter set into equation (1) to calculate the simulation response current. After calculating the simulation response current, the processor 102 may then perform step S07 of FIG. 1.

Figure 6:
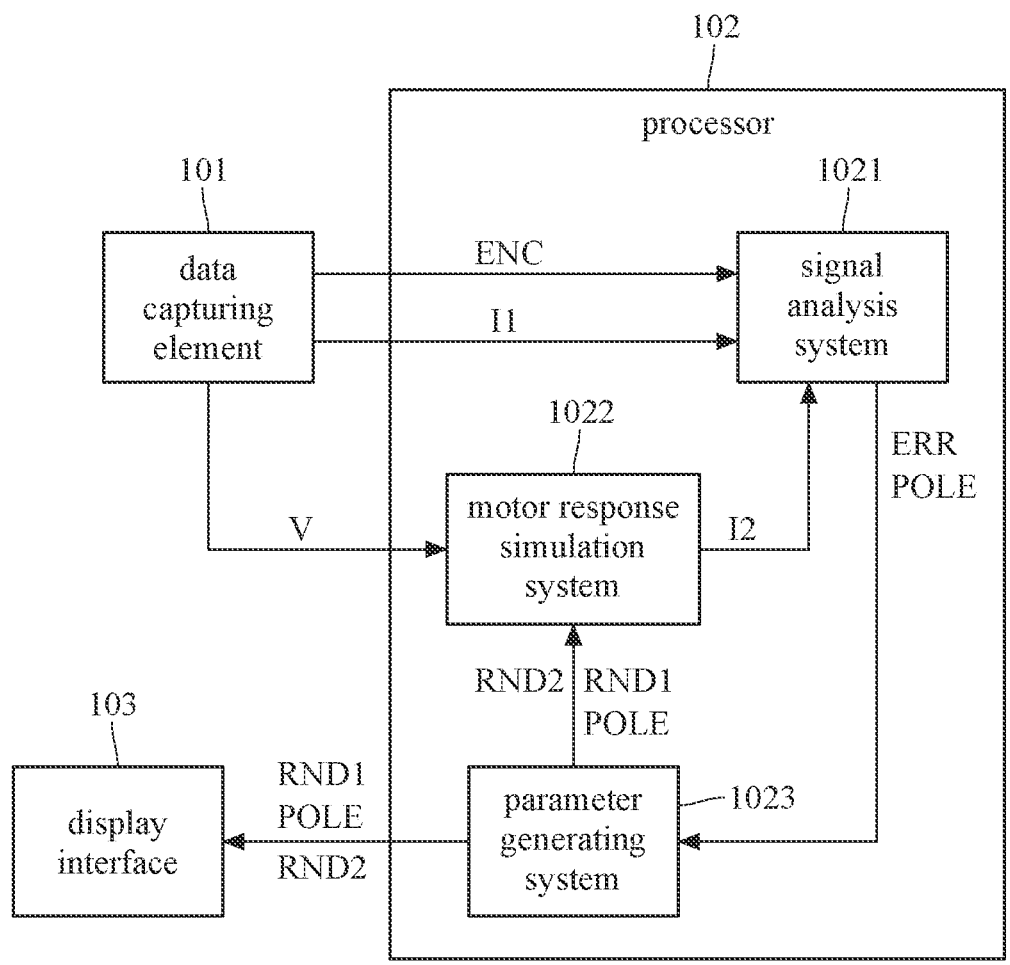
FIG. 6 is a schematic diagram illustrating the operation of the motor parameter estimation device and method according to embodiments of the present disclosure.

Please refer to FIG. 6. FIG. 6 is a schematic diagram illustrating the operation of the motor parameter estimation device and method according to embodiments of the present disclosure. It should be noted that, a signal analysis system 1021, a motor response simulation system 1022 and a parameter generating system 1023 in the processor 102 are illustrated for better understanding of the present disclosure and are not used to limit the scope of the present disclosure. The signal analysis system 1021, the motor response simulation system 1022 and the parameter generating system 1023 of the processor 102 in FIG. 5 may be implemented by a system based on software program.

First, the data capturing element 101 transmits the encoder signal ENC, the phase current I1 and the driving voltage V of the motor to the processor 102. The signal analysis system 1021 of the processor 102 obtains the number of poles POLE according to the encoder signal ENC and the phase current I1. The motor response simulation system 1022 of the processor 102 performs the simulation procedure according to the driving voltage V, the number of poles POLE and the initial random parameter set RND1 to calculate the simulation response current I2.

Then, the signal analysis system 1021 calculates the error value ERR between the phase current I1 and the simulation response current I2, and transmits the error value ERR to the parameter generating system 1023. The parameter generating system 1023 determines whether the error value ERR between the phase current I1 and the simulation response current I2 falls into the threshold range. When the error value ERR falls into the threshold range, the parameter generating system 1023 outputs the number of poles POLE and the initial random parameter set RND1 to the display interface 103. When the error value ERR falls outside of the threshold range, the parameter generating system 1023 outputs the update random parameter set RND2 to the motor response simulation system 1022. Then, the motor response simulation system 1022 performs the simulation procedure again according to the update random parameter set RND2, the driving voltage V and the number of poles POLE to calculate the simulation response current I2 corresponding to the update random parameter set RND2.

When the signal analysis system 1021 calculates the error value ERR between the simulation response current I2 and the phase current I1, and the parameter generating system 1023 determines the error value ERR falls into the threshold range, the parameter generating system 1023 may output the number of poles POLE and the update random parameter set RND2 to the display interface 103. In contrary, when the parameter generating system 1023 determines the error value ERR falls outside of the threshold range, the parameter generating system 1023 may output another update random parameter set to the motor response simulation system 1022 to perform the simulation procedure again.

In view of the above description, the motor parameter estimation method and device according to one or more embodiments of the present disclosure may obtain the motor parameters without dissembling the motor from the automatic equipment. Therefore, not only the complexity of obtaining the motor parameters may be reduced, the changing of coupling relationship between the motor and other components of the automatic equipment during the process of disassembling/installing the motor from/onto the automatic equipment may also be avoided. In addition, the motor parameter estimation method and device according to one or more embodiments of the present disclosure may obtain more accurate motor parameter sets in a shorter period of time as well as store without storing a large amount of inaccurate motor parameter sets derived during the process of performing the genetic algorithm.

What is claimed is:

1. A motor parameter estimation method, executed by a motor parameter estimation device, comprising:
   obtaining an operation signal of a motor, wherein the operation signal comprises an encoder signal, a phase current and a driving voltage;
   obtaining a number of poles of the motor according to the encoder signal and the phase current;
   performing a simulation procedure according to the driving voltage, the number of poles and an initial random parameter set, wherein the simulation procedure is calculating a simulation response current through a motor response simulation system;
   calculating an error value between the simulation response current and the phase current;
   determining whether the error value falls into a threshold range;
   if the error value falls outside the threshold range, performing the simulation procedure according to the driving voltage, the number of poles and an update random parameter set; and
   if the error value falls into of the threshold range, outputting the number of poles and the initial random parameter set.

2. The motor parameter estimation method according to claim 1, further comprising:
   before calculating the simulation response current, establishing a parameter set database, wherein the parameter set database comprises a plurality of candidate random parameter sets, and the initial random parameter set is one of the candidate random parameter sets.

3. The motor parameter estimation method according to claim 2, further comprising:
before generating the update random parameter set, updating the parameter set database, wherein updating the parameter set database comprises:
recording the calculated error value;
determining whether each of the candidate random parameter sets having a corresponding error value;
sorting the candidate random parameter sets according to the corresponding error value of each of the candidate random parameter sets when each of the candidate random parameter sets having the corresponding error value;
deleting at least one candidate random parameter set among the candidate random parameter sets, and keeping remaining candidate random parameter sets among the candidate random parameter sets, wherein the error value of the at least one candidate random parameter set is larger than the error values of the remaining candidate random parameter sets; and
performing a genetic algorithm on the remaining candidate random parameter sets to generate a new candidate random parameter set.

4. The motor parameter estimation method according to claim 3, further comprising:
selecting one of the candidate random parameter sets from the parameter set database after being updated as the update random parameter set.

5. The motor parameter estimation method according to claim 3, wherein performing the genetic algorithm on the remaining candidate random parameter sets comprises:
performing a selection and reproduction procedure, a crossover procedure or a mutation procedure on the remaining candidate random parameter sets.

6. The motor parameter estimation method according to claim 1, wherein the error value is a first error value, the simulation response current is a first simulation response current, performing the simulation procedure according to the number of poles and the update random parameter is calculating a second simulation response current, and the method further comprises:
after calculating the second simulation response current, determining whether a second error value between the second simulation response current and the phase current falls into the threshold range; and
outputting the number of poles and the update random parameter set when the second error value does not fall into the threshold range.

7. The motor parameter estimation method according to claim 1, wherein calculating the simulation response current according to the driving voltage, the number of poles and the initial random parameter set comprises:
calculating an initial current according to the driving voltage, the number of poles and the initial random parameter set;
calculating a motor torque according to the initial current;
calculating a motor revolution according to the motor torque; and
calculating the simulation response current according to the motor revolution, the number of poles and the driving voltage.

8. A motor parameter estimation device, comprising:
a data capturing element, configured to capture an operation signal of a motor, wherein the operation signal comprises an encoder signal, a phase current and a driving voltage; and
a processor, connected to the data capturing element to receive the operation signal, the processor having a motor response simulation system, the processor obtaining a number of poles of the motor according to the encoder signal and the phase current, performing a simulation procedure according to the driving voltage, the number of poles and an initial random parameter set, wherein the simulation procedure is calculating a simulation response current through the motor response simulation system,
the processor calculating an error value between the simulation response current and the phase current, and performing the simulation procedure according to the driving voltage, the number of poles and an update random parameter set if the error value falls outside a threshold range,
the processor outputting the number of poles and the initial random parameter set if the error value falls into of the threshold range.

9. The motor parameter estimation device according to claim 8, wherein before calculating the simulation response current, the processor further establishes a parameter set database, wherein the parameter set database comprises a plurality of candidate random parameter sets, and the initial random parameter set is one of the candidate random parameter sets.

10. The motor parameter estimation device according to claim 9, wherein before generating the update random parameter set, the processor records the calculated error value, sorts the candidate random parameter sets according to the corresponding error value of each of the candidate random parameter sets when determining each of the candidate random parameter sets having the corresponding error value, the processor further deletes at least one candidate random parameter set among the candidate random parameter sets, and keeping remaining candidate random parameter sets among the candidate random parameter sets, wherein the error value of the at least one candidate random parameter set is larger than the error values of the remaining candidate random parameter sets, the processor performs a genetic algorithm on the remaining candidate random parameter sets to generate a new candidate random parameter set.

11. The motor parameter estimation device according to claim 10, wherein the processor selects one of the candidate random parameter sets from the parameter set database after being updated as the update random parameter set.

12. The motor parameter estimation device according to claim 10, wherein the processor performs the genetic algorithm on the remaining candidate random parameter sets comprises: the processor performing a selection and reproduction procedure, a crossover procedure or a mutation procedure on the remaining candidate random parameter sets.

13. The motor parameter estimation device according to claim 8, wherein the error value is a first error value, the simulation response current is a first simulation response current, the processor performing the simulation procedure according to the number of poles and the update random parameter is to calculate a second simulation response current, and after calculating the second simulation response, the processor further determines whether a second error value between the second simulation response current and the phase current falls into the threshold range, and the processor outputs the number of poles and the update random parameter when the second error value does not fall into the threshold range.

14. The motor parameter estimation device according to claim 8, wherein the processor calculating the simulation response current according to the driving voltage, the number of poles and the initial random parameter set comprises: the processor calculating an initial current according to the driving voltage, the number of poles and the initial random parameter set, calculating a motor torque according to the initial current, calculating a motor revolution according to the motor torque, and calculating the simulation response current according to the motor revolution, the number of poles and the driving voltage.

15. The motor parameter estimation device according to claim 8, further comprising a display interface connected to the processor, with the processor outputting the number of poles and the initial random parameter set to the display interface.

\* \* \* \* \*